United States Patent
Hwang et al.

(10) Patent No.: US 7,743,171 B1
(45) Date of Patent: Jun. 22, 2010

(54) FORMATTING AND INITIALIZATION OF DEVICE MIRRORS USING INITIALIZATION INDICATORS

(75) Inventors: Pei-Ching Hwang, Shrewsbury, MA (US); Arieh Don, Newton, MA (US); Michael Scharland, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 532 days.

(21) Appl. No.: 11/014,405

(22) Filed: Dec. 16, 2004

(51) Int. Cl.
*G06F 3/00* (2006.01)

(52) U.S. Cl. .................. 710/5; 710/10; 710/19

(58) Field of Classification Search ............ 710/10, 710/5, 19
See application file for complete search history.

(56) References Cited

U.S. PATENT DOCUMENTS

| | | | |
|---|---|---|---|
| 5,206,939 A | 4/1993 | Yanai et al. | |
| 5,537,646 A * | 7/1996 | Buck et al. | 713/600 |
| 5,778,394 A | 7/1998 | Galtzur et al. | |
| 5,845,147 A | 12/1998 | Vishlitzky et al. | |
| 5,857,208 A | 1/1999 | Ofek | |
| 6,530,031 B1 * | 3/2003 | Randall et al. | 713/502 |
| 6,574,703 B1 * | 6/2003 | Don et al. | 711/112 |
| 6,665,743 B2 * | 12/2003 | Benhase et al. | 710/10 |
| 6,697,367 B1 | 2/2004 | Halstead et al. | |
| 7,062,605 B2 * | 6/2006 | Chatterjee et al. | 711/114 |
| 7,181,586 B2 | 2/2007 | Dallmann et al. | |
| 2002/0004890 A1 * | 1/2002 | Ofek et al. | 711/161 |
| 2003/0131163 A1 * | 7/2003 | Ishii et al. | 710/52 |
| 2005/0138318 A1 * | 6/2005 | Ash et al. | 711/170 |

* cited by examiner

*Primary Examiner*—Henry W. H. Tsai
*Assistant Examiner*—Kris Rhu
(74) *Attorney, Agent, or Firm*—Muirhead and Saturnelli, LLC

(57) ABSTRACT

Described is a technique for initialization of a device in a data storage system. A status indicating completion of the initialization is returned after setting initialization indicators associated with tracks of the device. The indicators indicate that the tracks of the device are to be initialized. As subsequent I/O operations for the device are processed, the tracks associated with the subsequent I/O operations are initialized prior to performing the I/O operation if the initialization indicators associated with the tracks are set. A background initialization task scans the initialization indicators and initializes tracks in accordance with the initialization indicators. Once a track has been initialized, its associated initialization indicator is cleared.

20 Claims, 12 Drawing Sheets

FORMATTING AND INITIALIZATION OF DEVICE MIRRORS USING INITIALIZATION INDICATORS

BACKGROUND

1. Technical Field

This application generally relates to a data storage system, and more particularly to techniques used with device initialization.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with data stored on one or more data storage systems. One task that may be performed in connection with a device of a data storage system is a command to initialize the device, such as with a SCSI format command. One existing technique for formatting a device on a data storage system may include, in addition to other processing steps, initializing each track of the device. Further, a system may utilize mirroring so that one or more mirrors of the device may also be initialized as part of the processing.

The foregoing existing technique has some drawbacks. Initializing each track of the device and one or more associated mirrors may be very time consuming and use a lot of computing resources. A track may define a portion of physical storage such as, for example, multiple blocks on a data storage device. The resources of the disk director or disk adapter (DA) performing the initialization of device tracks may be consumed to saturation so that the DA is unable to process other requests such as, for example, host I/O operations. Additionally, the amount of time to perform the initialization may cause a host that issued the format command to timeout while waiting for the initialization to complete.

A variation of the foregoing may notify the host that the format operation has successfully completed when a first mirror has its tracks initialized. However, the time taken to perform this initialization may still exceed an amount of time causing the host to timeout. Additionally, even if the host does not timeout, the host thinks that all mirrors have been initialized when, in fact, all the mirrors are not initialized. Subsequently, a write operation to the device may occur prior to completing initialization of all the mirrors so that a vulnerability exists in that the primary mirror may not be protected by the other mirrors (e.g., may not reflect the write operation).

Another approach may limit, or otherwise reduce, the amount of DA resources that can be devoted to performing the initialization operation at a point in time. While this makes DA resources available for performing other operations, such as host I/O operations, decreasing the DA resources allocated for use in initialization also further increases the amount of time it takes to perform initialization of the device and its associated mirrors.

Thus, it may be desirable to utilize a technique in connection with initializing a device and its associated mirrors which efficiently utilizes resources of a data storage system and performs the initialization within a time period that reduces the timeouts experienced by a host. It may also be desirable that such a technique provides data protection of write operations such that all mirrors protected. It may also be desirable that such a technique minimizes adverse performance related to host I/O operations.

SUMMARY OF THE INVENTION

In accordance with one aspect of the invention is a method for initializing a device in a data storage system comprising: receiving a command requesting processing which includes initializing said device; setting one or more initialization indicators each associated with a portion of said device indicating that said portion is to be initialized; and prior to performing a subsequent data request associated with a first portion of said device, initializing said first portion if a first initialization indicator associated with said first portion is set. The data storage system may process I/O operations for said device prior to completing initialization of all portions of said device. The command may be received from a host connected to said data storage system, and the method may further comprise: returning a status indicating completion of said command after all initialization indicators associated with all portions of said device are set. Each portion may correspond to a track of the device and the device may be a logical device. The command may be a format command to format said device and the method may also include: setting the device offline prior to setting said one or more initialization indicators of said device; and setting the device online after setting said one or more initialization indicators of said device. The device may have no mirrors. The device may have one or more mirrors. The command may be received by a processor connected to a disk adapter servicing said device, said processor and said disk adapter being included in said data storage system, and the method may further comprise: issuing a request by said processor to said disk adapter to initialize said device as part of processing for said command; setting by said disk adapter one or more initialization indicators associated with said device; and said processor returning a completion status for said command upon completion of said disk adapter setting said one or more initialization indicators and any other processing associated with said command and prior to initializing all portions of said device. The processor may be a fibre channel adapter in communication with a host issuing said command to said data storage system. The method may also include: executing a background initialization task to initialize portions of said device in accordance with one or more initialization indicators associated with portions of said device while said device is accessible for I/O operations. A completion status for said command may be returned prior to completing initialization of said associated device mirrors and after all initialization indicators associated with said device have been set and each disk adapter servicing a device mirror may perform initialization of said device mirror in accordance with said one or more initialization indicators associated with said device. Each disk adapter may perform initialization of said first portion of said device mirror in accordance with said first initialization indicator in connection with a write operation to said first portion. Each disk adapter may perform initialization of said first portion of said device mirror in accordance with said first initialization indicator in connection with reading data from said first portion. The method may also include clearing said first initialization indicator after said first portion is initialized. A background initialization task may scan initialization indicators associated with said device and performs initialization of one or more portions of said device in accordance with the initialization indicators, said background task executing while said device is accessible for I/O operations, said background task clearing initialization indicators as associated portions are initialized. The method may also include returning a status indicating completion of said command, said status being returned prior to initializing all portions of said device and after all initialization indicators associated with said device have been set. The method may also include: receiving at said data storage system a second command from a host inquiring about the status of said command; and returning a status indicating that said command is in progress prior to all initialization indicators associated with all portions of said device being set.

In accordance with another aspect of the invention is a data storage system comprising: a disk adapter servicing a device in said data storage system; a processor in said data storage system which receives commands to be executed by said data storage system; wherein said disk adapter includes: code that sets one or more initialization indicators each associated with a portion of said device indicating that said portion is to be initialized; code that, upon receiving a data request for a first portion of said device, initializes said first portion in accordance with a first initialization indicator associated with said first portion prior to processing said data request; and code that returns a status indicating completion of a command, said command including initialization of said device, said status being returned prior to initializing all portions of said device and after all initialization indicators associated with said device have been set.

In accordance with another aspect of the invention is a computer program product for initializing a device in a data storage system comprising code that: receives a command requesting processing which includes initializing said device; sets one or more initialization indicators each associated with a portion of said device indicating that said portion is to be initialized; and prior to performing a subsequent data request associated with a first portion of said device, initializes said first portion if a first initialization indicator associated with said first portion is set. The data storage system may process I/O operations for said device prior to completing initialization of all portions of said device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
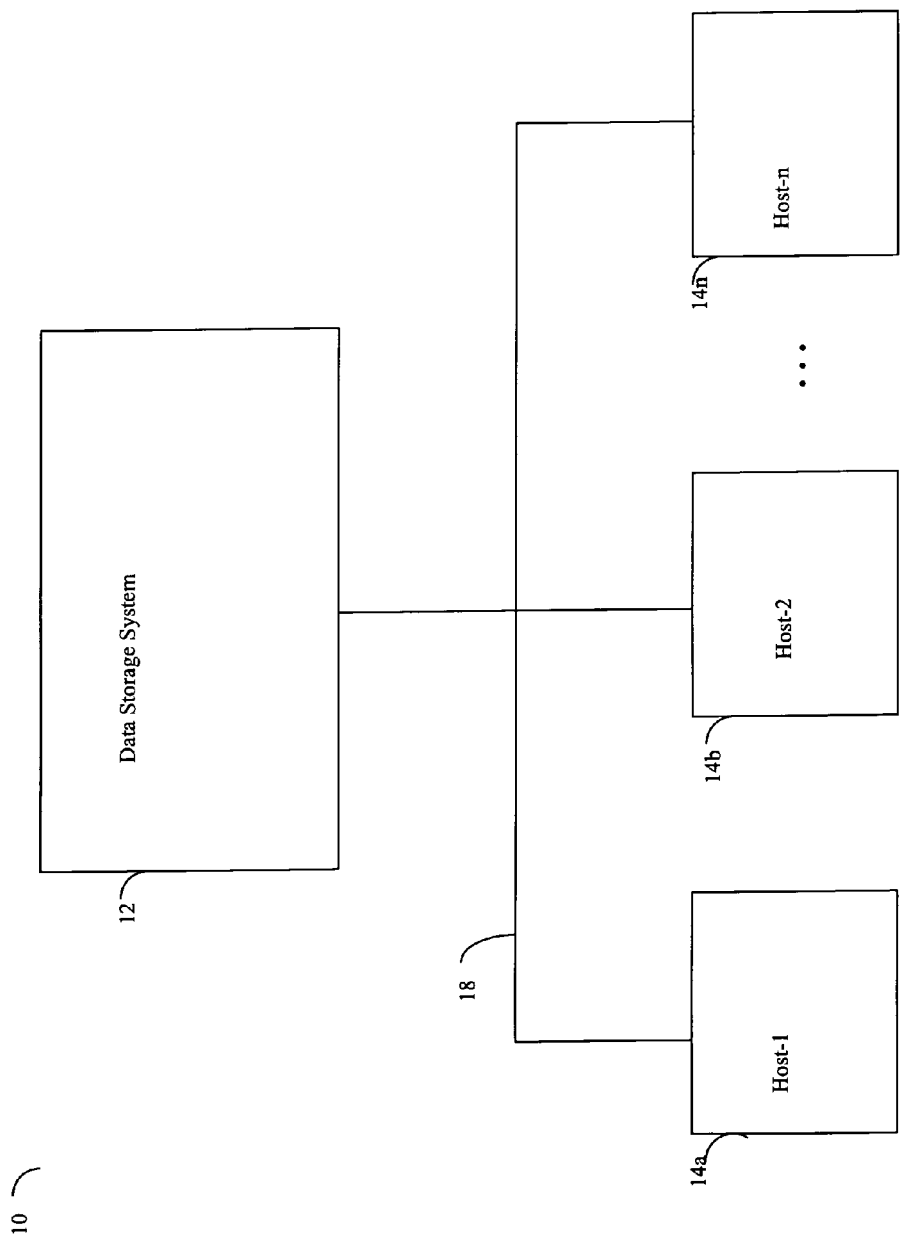
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
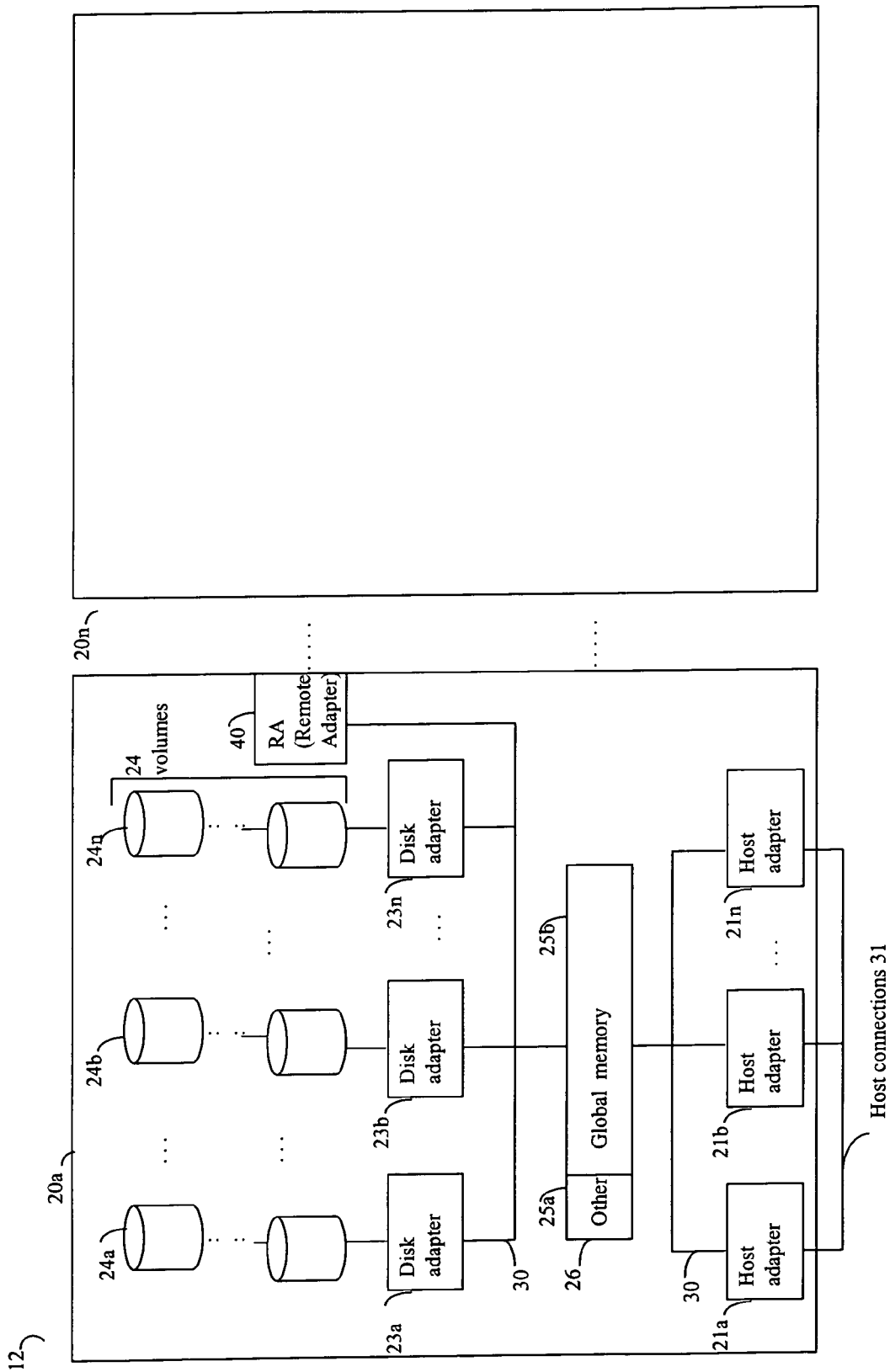
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
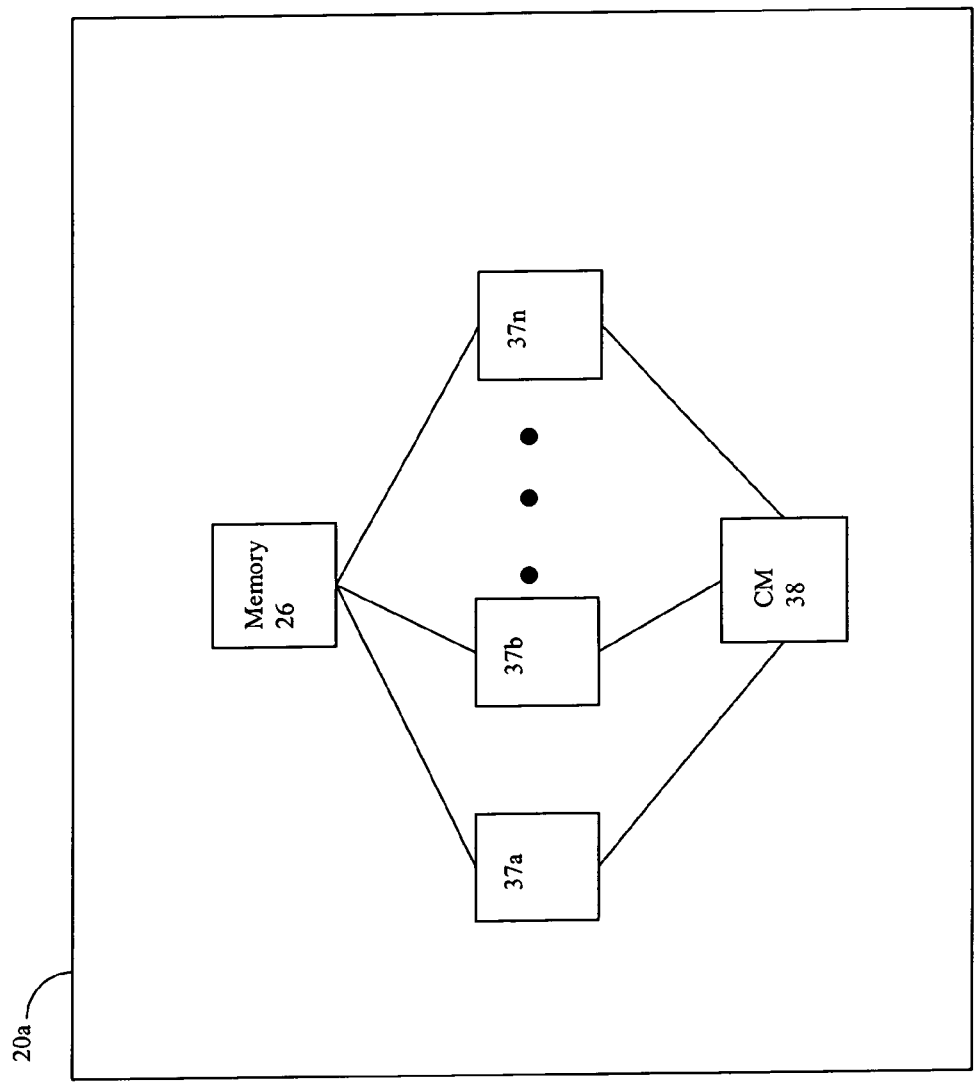
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
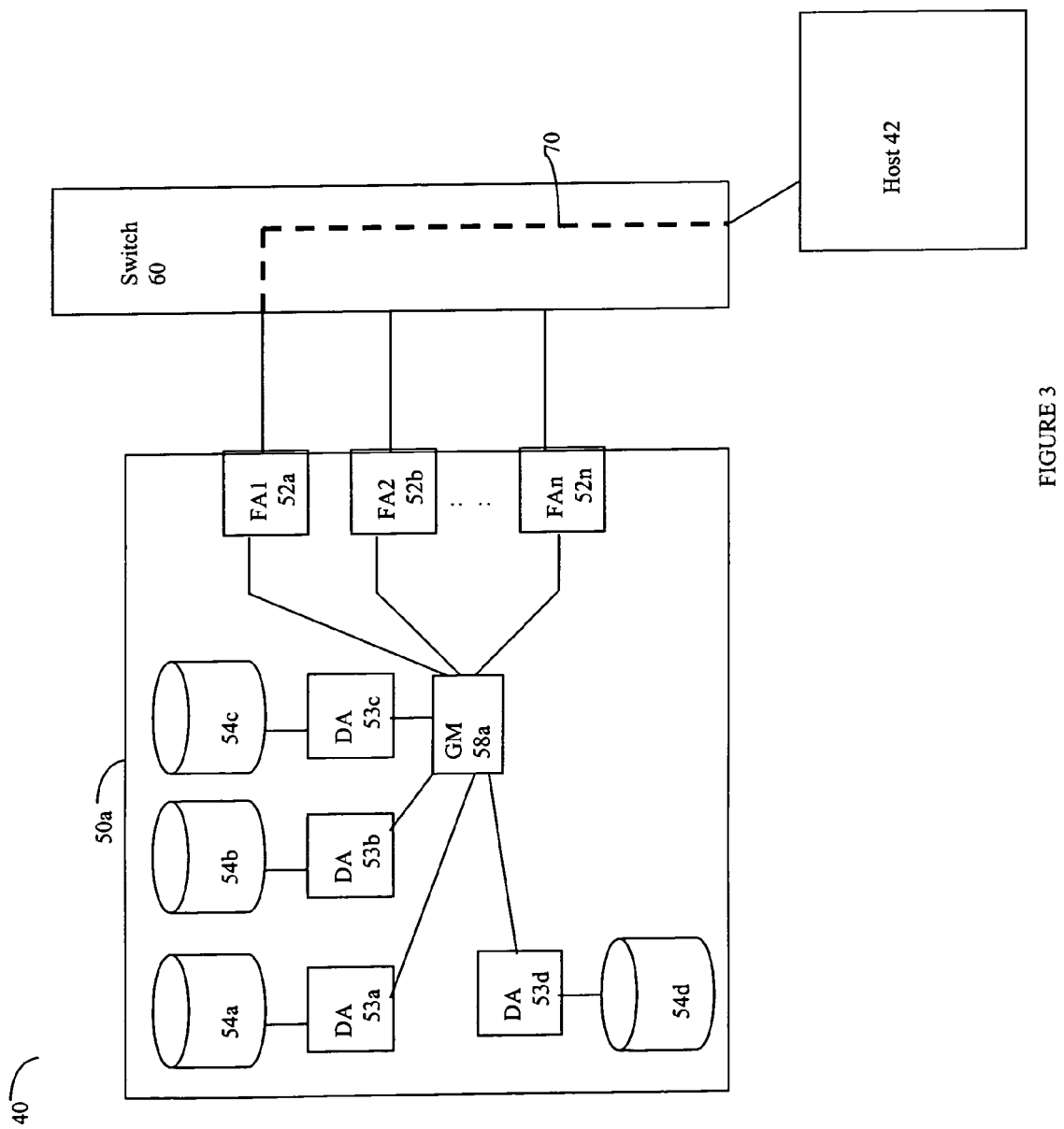
FIG. 3 is a more detailed example of an embodiment of a computer system that may utilize the techniques described herein.

Referring now to FIG. 3, shown is an example of an embodiment of a computer system 40 that may be used in connection with the techniques described herein. It should be noted that the embodiment illustrated in FIG. 3 presents a simplified view of some of the components of a computer system as generally illustrated in FIGS. 1 and 2A, for example, including only some detail of the data storage system 50a for the sake of illustration.

Included in the system 40 is data storage system 50a, a switch 60 and a host 42. The data storage system 50a and the host 42 may communicate using switch 60. In this example, the data storage system 50a includes data storage devices 54a-54d, DAs 53a-53d, global memory (GM) 58a, and multiple Fibre Channel Adapters (FAs) 52a-52n. Each of the FAs 52a-52n has a Fibre Channel connection to the switch 60 to facilitate communications with the host 42. The host 42 may issue a command to data storage system 50a through switch 60 over path 70 to one of the FAs 52a-52n.

A command may be issued from the host 42, or from a task executing within the data storage system 50a, to initialize a device on the data storage system 50a. For example, the host may issue a command, such as a SCSI format command, to format a device such as device 54a. In connection with performing the format operation, the device 54a may be initialized. Additional detail in connection with performing the format operation and initialization processing in an embodiment is described in more detail elsewhere herein.

With reference to FIG. 3, the format command may be issued from the host 42 to the data storage system 50a. The host may communicate with FA 1 52a. FA 1 52a may execute code to control the format operation and issue one or more commands to DAs as needed in performing the necessary steps of the format operation. The FAs may communicate with the DAs through use of a messaging technique with a request buffer in GM. In one embodiment, as will be described in more detail herein, an FA may place a message in the request buffer of the GM for one or more DAs. Each of the DAs may poll the request buffer for incoming messages which are directed to each DA. When a DA has processed a message from the request buffer, the DA may communicate a status or other information to the FA also through the request buffer.

It should be noted that other embodiments may use other techniques to facilitate communications between components of the data storage systems than as described herein. For example, an embodiment may use an alternative technique which utilizes, for example, event notification techniques rather than a polling technique. These and other variations will be appreciated by those of ordinary skill in the art.

In connection with returning data to a host, for example, from one of the devices such as 54a, data may be copied from 54a by the DA servicing requests for device 54a. In FIG. 3, the DA servicing device 54a is DA 53a. Data may be copied from device 53a by DA 54a to GM (Global Memory) 58a. Data from GM 58a may then be communicated to one of FA 52a-52n, switch 60, and then to the host 42.

In connection with performing operations, such as a format operation, associated with a device, a track id table which includes device information may be used in an embodiment.

Figure 4:
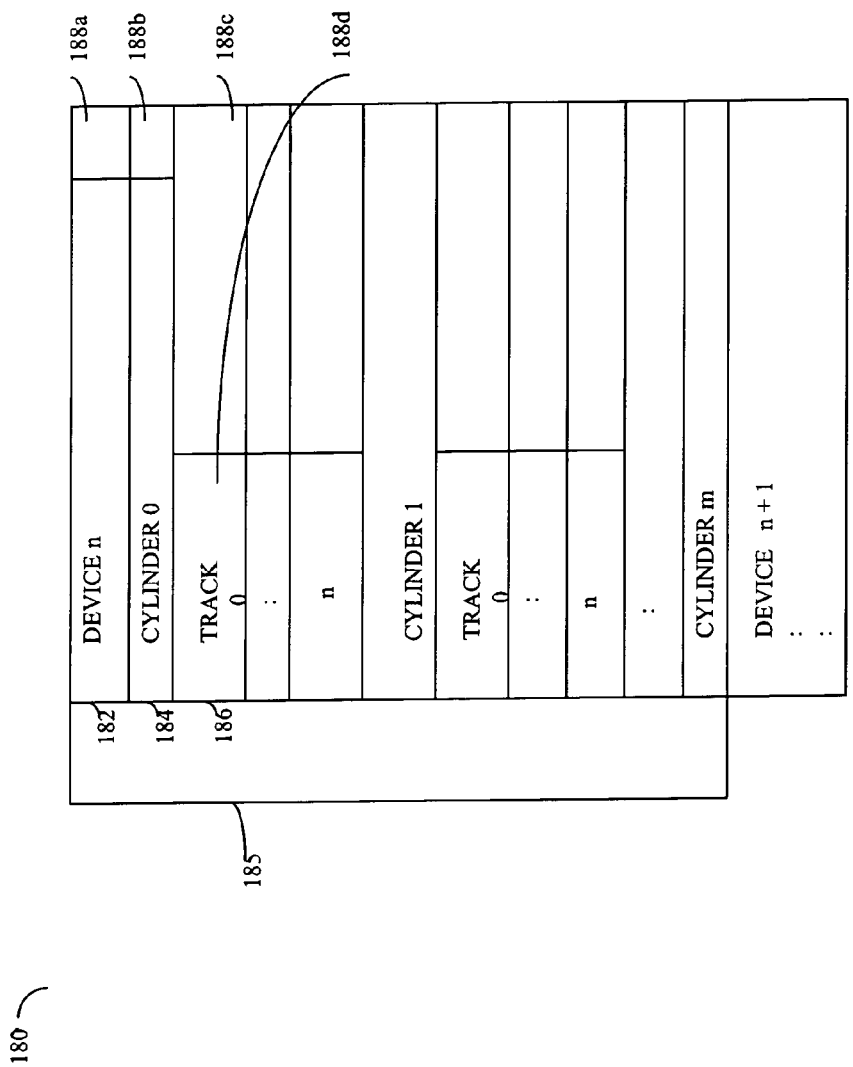
FIG. 4 is an example of an embodiment of a track id table.

Referring now to FIG. 4, shown is an example of a representation of a track id table 180. The table 180 may be organized on a device-by-device level to indicate for a particular portion of a device, is the portion in cache, and if so, where in cache is it located. An embodiment that includes devices, for example, such as disks, may include a further refinement or granularity in the table 180 corresponding to a location in cache. The table 180 may also be used to store information about each particular track as will be explained in more detail below.

The table 180 may include a hierarchical structure relative to the structure of a disk, such as cylinders and tracks on a disk. In one embodiment, a track may be a 32K byte portion aligned with the beginning of the device and a cylinder may be 15 tracks. Other embodiments may use different structures and/or sizes. Each device, such as device n, may have a corresponding portion 185 included in the table. Each of the portions 185 may further be divided into sections in accordance with the disk structure. A portion 185 may include device header information 182, information for each cylinder 184, and for each track within each cylinder 186. For a device, a bit indicator 188a may indicate whether data associated with the device is stored in cache. The bit indicator 188b may further indicate for a particular cylinder within a device, is any data stored in the cache. Associated with each track may be a corresponding portion 188c which may include information about a particular track. In one embodiment, portion 188c may indicate whether data associated with a particular track is in the cache and an associated address of where in the cache the data for a particular track may be found, for example, in connection with performing a read operation or a pending write operation. The portion 188c may include other information associated with a particular track, such as a valid cache address if data is stored in the cache for the particular track. The portion 188c may also include one or more bit flag indicators and indicate information related to each device track.

Figure 5:
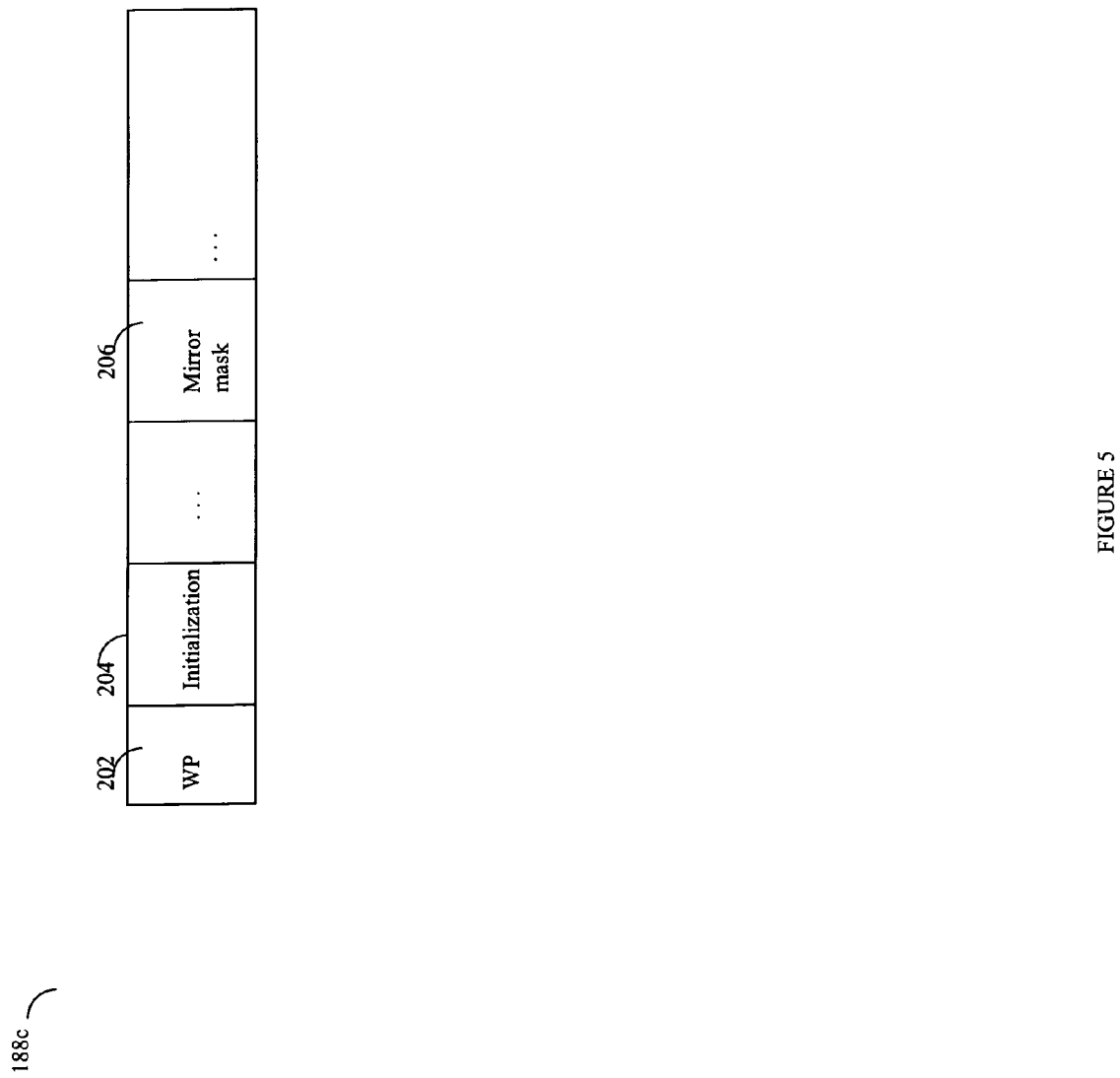
FIG. 5 is an example of an embodiment of a portion of an entry in the table of FIG. 4.

Referring now to FIG. 5, shown is an example representation of information that may be included in an embodiment of portion 188c as illustrated in the track id table of FIG. 4. The portion 188c is associated with a track of a device and included in the track id table. FIG. 5 shows in more detail, for example, particular bit flags that may be associated with a track. It should be noted that although FIG. 5 refers specifically to element 188c which corresponds to track 0 of device N, it should be noted that other tracks may include similar information as generally described in connection with section 188c.

Included in FIG. 5 are the following: a WP or write pending flag 202, an initialization flag 204, a mirror mask 206, and other information. The WP flag 202 may be set (e.g., set to 1) for example, to indicate that the data associated with the track is write pending. As described in more detail elsewhere herein, a track of data associated with a write operation may be write pending. In one embodiment, rather than write data directly to a data storage device, data may first be written to cache. Data may be destaged at a later point in time from the cache to the actual data storage device. While the data is in the cache and waiting to be destaged to the actual data storage, the WP flag 202 may be set to indicate that the cached data is waiting to be written out to the actual data storage device. The WP flag indicates that the cached data is the most recent copy of the data and differs from the actual content stored on the data storage device. The initialization bit or indicator 204 may be set (e.g., set to 1), for example, when a particular track associated with the initialization bit 204 has not yet been initialized such as in connection with the format command. Once the associated track has been initialized, the initialization bit may be cleared (e.g., set to 0). Techniques will be described in following paragraphs which utilize the initialization bit 204 as may be included in the track id table for each track. The track id table may also include a mirror mask bit setting 206 indicating which particular mirrors are associated with a data storage device. For example, in one embodiment, a data storage device may have up to four mirrors. Accordingly, the bit mask may have four bits, one corresponding to each possible mirror. A mirror having its corresponding bit within the mask 206 set (e.g., 1) indicates that the mirror is enabled for a particular device. A bit mask value of zero indicates that that particular mirror is not enabled for use with the data storage device.

It should be noted that an embodiment may use different techniques in connection with data that is read from, or written to, devices in the data storage system. In one embodiment, a cache may be used in connection with processing data for read and write operations. In connection with a read operation, the DA may read the data requested from the device and store it in a cache slot included in cache. The DA, for example, may obtain a cache slot if there is not already one allocated and associated with a particular track id entry as indicated in the track id table 180. The data is read from the physical device by the DA and stored in the cache slot. Indicators associated with the cache slot, entry in the track id table, and other structures, may be appropriately updated in accordance with the data operation, the state of the data included in the cache slot, and the like. Data that is to be written to a device may be first stored in a cache slot and marked as a write pending. The data is then actually written out to the physical device at a later point in time. Use of a cache as a temporary holding place for received data to be written and other techniques may be employed in an embodiment to process the incoming write requests since the actual writing of data to a device may be characterized as comparatively slower when compared to the rate at which data is transferred to the target location.

For sake of simplicity to illustrate the techniques described herein for initializing a device, a first example and description will be set forth in which mirroring is not described in detail. In other words, processing steps are first described utilizing a technique described herein for initialization of a device for only the original data storage device. Further examples illustrate the use of the techniques described herein in an embodiment using mirrors. It will be appreciated by those of ordinary skill in the art that the techniques described herein may be used in an embodiment with and without mirroring of devices.

Figure 6:
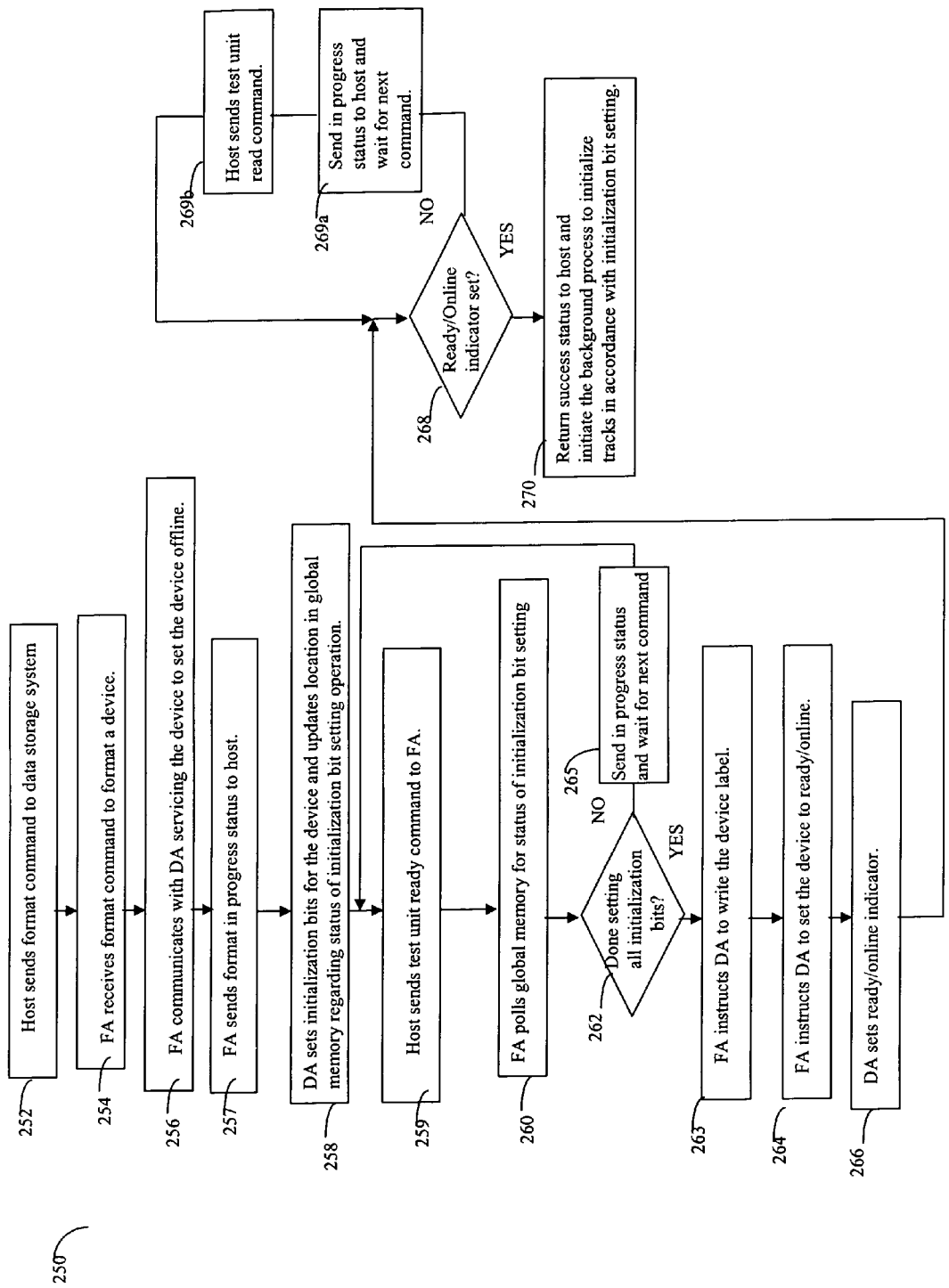
FIG. 6 is a flowchart of processing steps that may be performed in an embodiment in connection with a format command including device initialization processing.

Referring now to FIG. 6, shown is a flowchart 250 of processing steps that may be performed in an embodiment in connection with processing associated with a format command. Included in this processing for the format command are steps for initializing a device. It should be noted that although the techniques described herein for initialization are set forth in an example with reference to a format command, the initialization techniques may be performed in connection with other commands besides the format command.

At step 252, a host sends a format command to a data storage system. It should be noted that the command causing initialization processing using the techniques described herein may be received by a data storage system in connection with other activities and operations. For example, the command does not have to be sent by a host. The initialization of a device may occur, for example, when a new device is brought online for use in the data storage system. At step 254, an FA receives the format command to format a device. At step 256, the FA communicates with the DA servicing the device to set the device offline making the device unavailable for data requests, such as I/O operations. At step 257, a status is returned to the host indicating that the format command is in progress. At step 258, the DA sets the initialization bits for the device in the track id table. Additionally, while the setting of the initialization bits is in progress, the DA may update a counter location in global memory indicating the status of the initialization bit setting operation. In this example, at step 258, the FA instructs the DA to set the initialization bits in the track id table for the particular device which is to be formatted in accordance with the host format command received at step 252. The DA accesses the appropriate locations within the track id table and accordingly sets the initialization bits of each of the different tracks associated with a particular device to indicate that the associated tracks have not yet been initialized. In this embodiment described herein, the DA may keep a counter or other status value updated in global memory in accordance with particular initialization bits that have been set by the DA at each point in time. The FA may continually poll global memory for the status of the initialization bit setting operation by reading the counter or status value set by the DA. In other words, the DA communicates with the FA regarding the status of the initialization bit settings for a particular device by updating a location in global memory. The FA, by polling and viewing the status of this global memory location, may determine when the initialization bit setting is complete as associated with the format command. It should be noted that other techniques may be used in connection with facilitating communications between the DA and the FA so that the FA receives an indication as to when the DA has successfully completed setting of the initialization bits within each of the tracks in the track id table. Prior to beginning this polling by the FA, the FA receives a test unit ready command from the host at step 259. At step 260, in response to receiving this test unit ready command, the FA may commence polling regarding status of the initialization bit setting as being performed by the DA. It should be noted that the test unit ready command received by the host is the first such command of this type that may be received by the FA. As described in connection with other processing steps, the host may continually poll the FA with test unit ready commands to inquire regarding the status of the initialization bit setting. However, in response to the first of these such commands, the FA begins its polling process to monitor the status of the operation as performed by the DA. At step 262, a determination is made as to whether the setting of all of the initialization bits is complete. If not, control proceeds to step 265 where the FA sends an in progress status message to the host and waits for the next host test unit ready command. When the host sends the next test unit ready command at step 259, the FA continues polling the status of the global memory location. This polling process may continue until all of the initialization bits have been set. Once all of the initialization bits for a particular device have been set causing step 262 to evaluate to YES, control proceeds to step 263 where the FA instructs the DA to write a device label. At step 264, the FA instructs the DA to set the device to indicate that the device is online and available for use, for example, by a host or other computer system. At step 266, the DA sets the device ready or online indicator in accordance with the FA instruction at step 264.

The device ready or online indicator may be stored in a location in global memory that includes other information regarding the status of devices in the data storage system. At step 268, the FA determines if the online or ready indicator has been set for the particular device. If not, control proceeds to step 269a to send an in progress status message to the host. At step 269b, the FA waits for the host to send a test unit ready command and then continues with step 268 to poll the online indicator setting. This polling of the online indicator may continue until the FA determines at step 268 that the ready or online status indicator has been set to indicate that the particular device is available online. When step 268 determines that the ready or online indicator for the particular device has been set, control proceeds to step 270 where a successful completion status is returned to the host in connection with the format command. Additionally, an embodiment may also issue a command to initiate a background task to begin initializing tracks in accordance with the initialization bit setting. Alternatively, an embodiment may continually have a background process running which is always scanning the track id table and initializing any tracks in accordance with the initialization bit setting for each track.

The processing at step 270 returns a successful completion status to the host in connection with the format command and its associated device initialization processing without actually physically initializing the device tracks. Described in following paragraphs are additional processing steps which may be performed in an embodiment to facilitate use of the foregoing initialization bit in connection with initializing a device to ensure data protection of the device and any associated mirrors.

Figure 7:
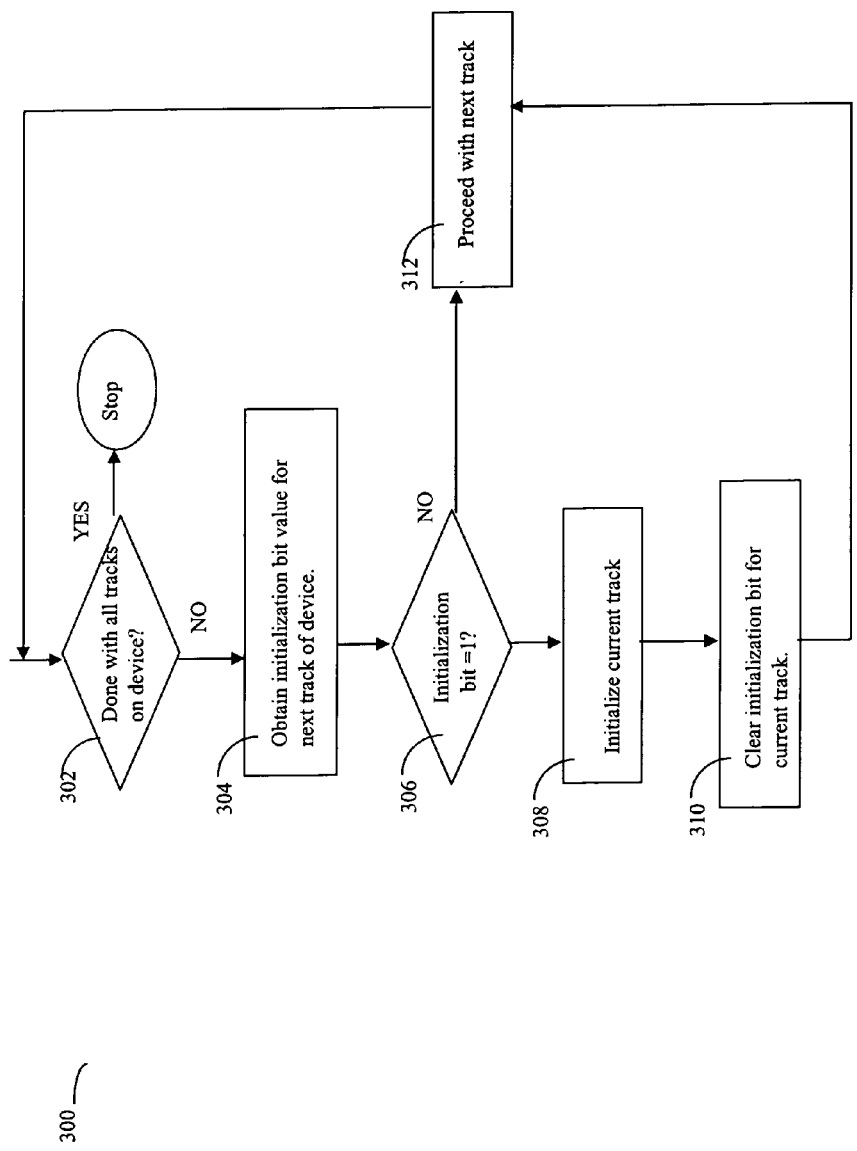
FIG. 7 is a flowchart of processing steps that may be performed in an embodiment in connection with background initialization processing.

Referring now to FIG. 7, shown is a flowchart 300 of processing steps that may performed in an embodiment in connection with the background initialization processing, for example, described in connection with step 270 processing. As alternatively described, the background initialization process may execute as a background task continually scanning all of the tracks in the track id table looking for initialization bits=1, and initializing those particular tracks. This background process as described in connection with FIG. 7 may be performed in an ongoing manner while also allowing other data operations or requests to the data storage device. The processing steps of flowchart 300 describe in more detail the background initialization processing as may be performed, for example, by a DA or on each DA that may be included in an embodiment.

At step 302, a determination is made as to whether processing is done for all of the tracks on a device. If so, processing stops for track initialization on that particular device. Processing as may be performed by the background task may continue with a next device for the continuous ongoing scanning. If all of the tracks associated with a current device at step 302 have not been processed, control proceeds to step 304 where the initialization bit value for the next track of the current device is obtained. At step 306, a determination is made as to whether the initialization bit read at step 304 is set (e.g., =1) indicating that the associated track has not yet been initialized. If the initialization bit is not set (e.g., =0), this indicates that the current track does not require initialization. Control then proceeds to step 312 to continue processing with the next track. Otherwise, if the initialization bit is set indicating that the current track has not yet been initialized, control proceeds to step 308 to initialize the current track. Accordingly, control proceeds to step 310 to clear the initialization bit for the current track (e.g., =0). Processing continues with the next track at step 312. It should be noted that the processing of flowchart 300 is written with respect to initialization of tracks on a particular device. When initialization processing for the device is complete, the background task may continue executing the steps of flowchart 300 with the next device.

The DA may execute the background task performing initialization processing while also handling data requests to the devices serviced by the DA. I/O operations may be allowed to a device which has been processed in accordance with the steps of flowchart 250 of FIG. 6, resulting in initialization bit settings, prior to physically initializing each track on the device. What will now be described are processing steps that may be performed by a data storage system in connection with handling a data request for a device having tracks which may not yet be initialized.

Figure 8:
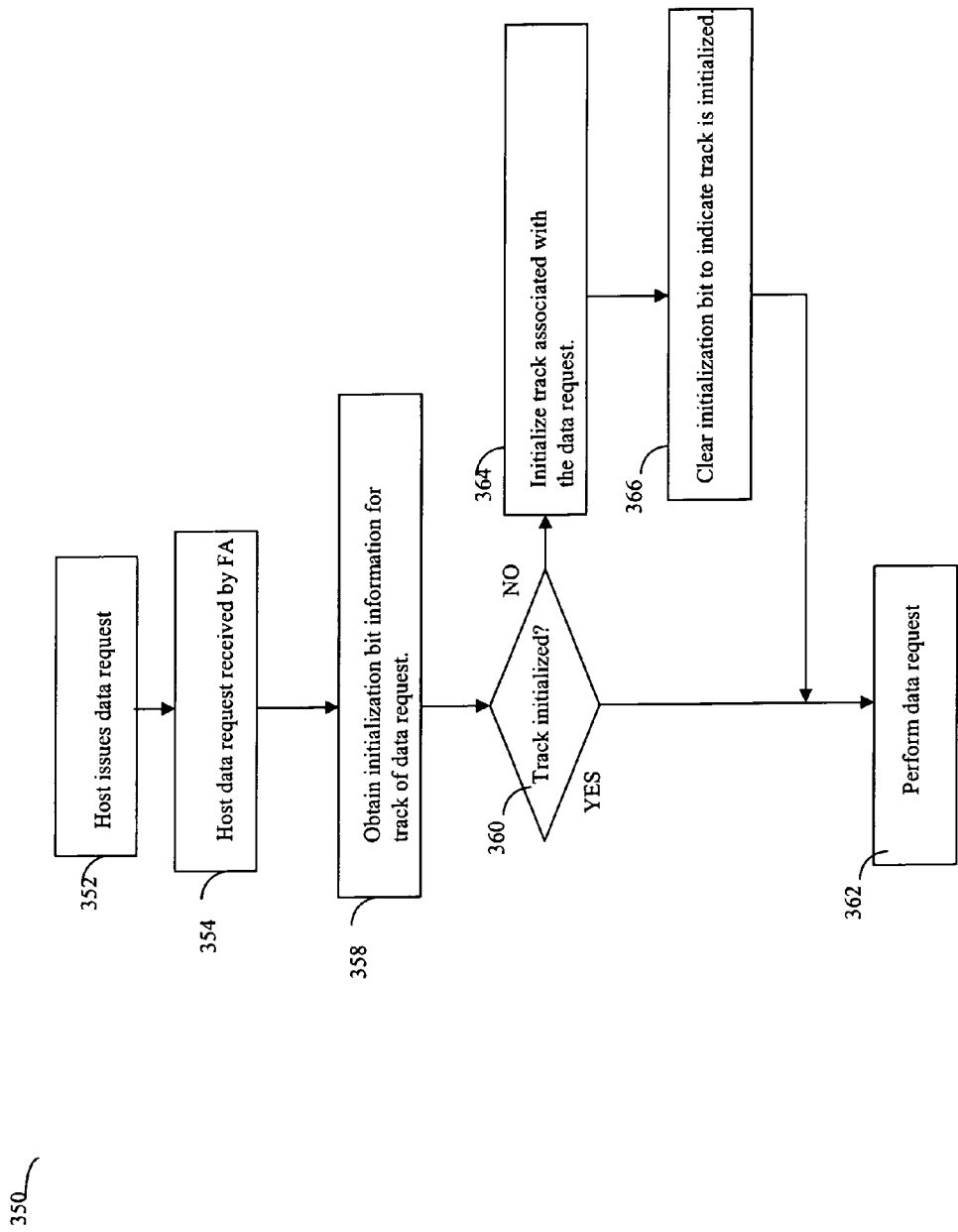
FIG. 8 is a flowchart of processing steps that may be performed by a data storage system in connection with processing a data request received from a host.

Referring now to FIG. 8, shown is a flowchart 350 of processing steps that may performed by a data storage system in connection with processing a data request as received from a host. It should be noted that the processing steps of flowchart 350 are generalized to describe the overall processing that may be performed in an embodiment in connection with different data requests, such as both read and write operations. The particular components, such as the FA and/or DA that may perform the different steps of 350, may vary with embodiment and data operation. More detail regarding the generalized steps of 350 are illustrated in connection with other examples for read and write operations in following paragraphs in connection with other figures. The data request may be, for example, a read or a write I/O operation to a device having been processed in accordance with the steps of FIG. 6. A device may not yet physically have its tracks initialized, for example, by processing of the background task and a host may issue a data request, such as a read or write operation to the device. At step 352, the host issues a data request which is received at step 354 by an FA. At step 358, prior to performing the read or write operation, the initialization bit information for the track of the associated data request received at step 354 is obtained. It should be noted that step 358 may be performed by the DA and/or the FA depending on the data operation and the particular embodiment. Examples are described in more detail in following paragraphs in connection with other figures. At step 360, a determination is made by the DA as to whether the track is initialized in accordance with the initialization bit information from the track id table. If the track is indicated as initialized at step 360 by the initialization bit information, control proceeds to step 362 to perform the data request. Otherwise, control proceeds to step 364 to initialize the track associated with the data request. Once the initialization is complete by the DA, the initialization bit is cleared within the track id table at step 366 to indicate that the particular track has been initialized. Control then proceeds to step 362 to perform the data request. It should be noted that the processing described in connection with flowchart 350 is for a data request associated with a single track of data. If the data request is associated with more than one track of data, steps 358, 360, 362, and conditionally steps 364 and 366 (when step 360 evaluates to NO) may be performed for each track of data. It should be noted that step 366 may be performed by the DA and/or the FA depending on the particular embodiment and data operation. Examples are described in more detail in following paragraphs.

The processing of flowchart 350 of FIG. 8 ensures that tracks associated with a data request are initialized in accordance with initialization bit indicators before performing the data request. A track may be initialized prior to performing an I/O operation as indicated in accordance with the initialization bit setting. In the event that the background task has previously initialized a particular track, such as in connection with flowchart 350 processing, the background task would have also previously cleared the initialization bit so that processing of steps 364 and 366 are not performed. However, in the event that a data request is made prior to the background task initializing the particular track, the processing of flowchart 350 of FIG. 8 ensures that the track is initialized prior to performing a subsequent data request. The processing of flowchart 350 of FIG. 8 may be characterized as prioritizing initialization of particular tracks if those tracks are associated with a data request and have not yet been initialized. Otherwise, the background task performing the initialization will scan each track of a device, for example, in sequential order, and initialize each track as encountered. This initialization processing in the order as may be performed by a background task may be altered by processing of flowchart 350 of FIG. 8 which provides for initialization of a track out of this order in the event that a data request for an uninitialized track is received such as, for example, receiving an I/O operation request from a host. Receiving the host I/O operation causes any uninitialized track associated with the I/O operation to be initialized prior to performing the I/O operation.

It should be noted that in connection with the resources described herein stored in global memory that may be accessed by one or more processors, an embodiment may use any one or more synchronization techniques known to those of ordinary skill in the art. The resources stored in global memory may include, for example, the track id table, the location indicating the status of the initialization bit setting operation, and the like. The particular locking technique or other type of synchronization element that may be used may vary in accordance with the particular embodiment and functionality included in each data storage system. Although steps such as locking and unlocking are not explicitly recited in connection with accessing shared resources, it will be appreciated by one of ordinary skill in the art that such operations for synchronizing access to the resources may be performed in connection with processing described herein.

The foregoing processing may be performed in connection with a format or other command in which a device may be initialized. The format and/or initialization commands described herein may be, for example, a SCSI format command. Other device commands may also be included in an embodiment.

The foregoing techniques allow for a status to be returned to a host in connection with performing a format and/or an initialization command without actually requiring initialization of the particular device. Rather, the techniques described herein, allow for a status value to be returned to the host when the initialization bits have been set in the track id table. By ensuring that a track is physically initialized in accordance with the initialization bit setting prior to performing any subsequent I/O operation in connection with that particular track, the techniques described herein allow for reporting to the host that the format and/or initialization is complete prior to actually initializing the tracks of an associated device.

What will now be described in more detail are the processing steps described herein using the initialization techniques in an embodiment using mirroring.

Figure 9:
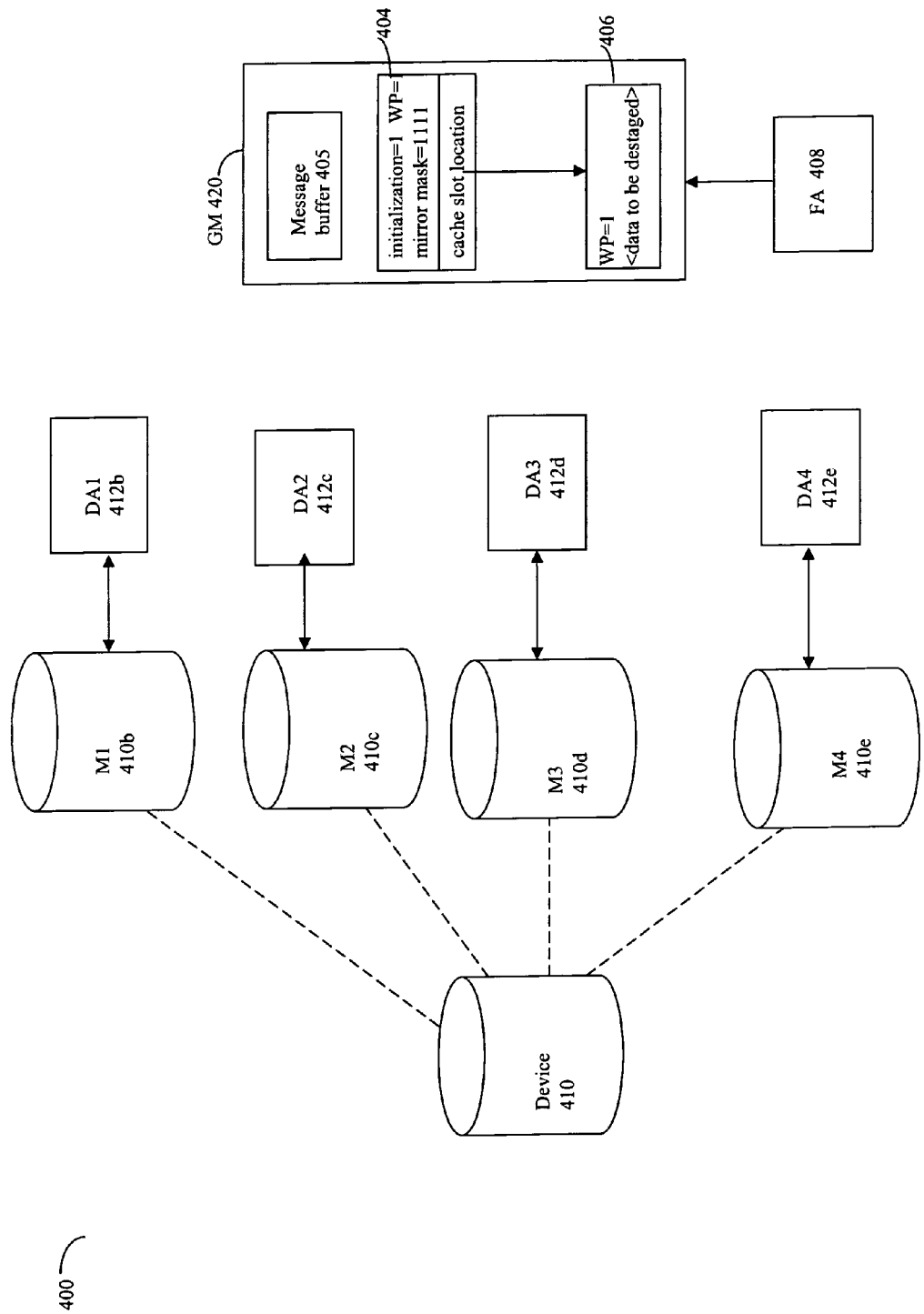
FIG. 9 is an example of components of a data storage system illustrating the techniques described herein for initialization.

Referring now to FIG. 9, shown is an example of an embodiment of components that may be included in a data storage system using the techniques described herein for initialization of a device having multiple mirrors. In the example 400, the original device 410 is represented as having four mirrors or 410b-410e. It should be noted that the particular example described herein using four mirrors should not be construed as a limitation of the techniques described herein. An embodiment may use a different number of device mirrors than as described in this example. The particular number of mirrors that may be included in an embodiment may vary with each particular application and with the particular limitations or features associated with each embodiment. In this example, each of the mirrors 410b-410e may be included in a single data storage system. It should be noted that each of the mirrors in this example is serviced by a DA. Although the example 400 shows each mirror as being serviced by a different DA, an embodiment may have a single DA service one or more of the mirrors. Each DA associated with a mirror is responsible for servicing data operations for that particular mirror. Data operations may include, for example, read and write operations as may be issued from a host connected to the data storage system. Also included in the example 400 is GM (global memory) 420. The FA 408 may receive a host data request, such as an I/O operation, and communicate this I/O operation to one or more DAs included in the data storage system. A message buffer 405 may be stored in GM 420 and used to facilitate this and other communications between the DA and FA and other components in the data storage system.

It should be noted that the components included in the example 400 of FIG. 9 may represent only a portion of those included in a data storage system to illustrate the initialization technique described herein.

What will now be described in connection with FIG. 9 is processing associated with a write operation as received by FA 408 from a host connected thereto, although not included in the example 400. With reference to FIG. 9, processing steps for initialization of device 410 have been performed in accordance with setting the initialization bits for tracks of device 410. In this particular example, not all tracks of the mirrors associated with device 410 have been initialized prior to receiving a write operation. The FA 408 receives the write operation to write to a track of the device 410 which has not yet been initialized. The FA places a message in the message buffer for each of the DAs servicing the associated mirrors to appropriately initialize the track associated with the write operation in accordance with the initialization bit setting. When all of the DAs servicing the mirrors have performed initialization of the physical track, control returns to the FA. The FA then clears the initialization bit in track id table entry 404, obtains a cache slot 406 and stores the data from the write operation in the cache slot 406. The FA may also perform other processing in connection with the write operation such as, for example, updating other fields of the cache slot (e.g., the WP flag=1 indicating a write pending track), track id table, and the like. The data in the cache slot 406 is destaged at a later point to the mirrors 410b-410e for the device 410. Once the data has been stored in the cache slot 406 and other appropriate processing successfully completed but prior to destaging the data, the FA 408 may return a success status to the host. In this example for processing associated with a write operation in an embodiment using mirrors, prior to actually writing the data out to the particular device as part of destaging, each DA servicing a mirror performs initialization of the track in accordance with the initialization bit indicated in 404. Once the data associated with the write command has been destaged to each of the mirrors, any initialization required for each of the device mirrors has also been performed prior to destaging of the write operation data.

It should be noted that any one of a variety of different techniques may be used in connection with communications between components such as the FA and the DA as well as in connection with destaging the data. Using the techniques described herein, the initialization of the mirrors may be performed as part of the write operation processing by each of the DAs servicing a mirror. The destaging and any associated initialization processing may be performed asynchronously by each DA servicing each of the device mirrors independent of the other DAs as each DA has available bandwidth. The destaging of the write data may be considered complete when all DAs of all mirrors have completed processing.

The foregoing techniques provide for prioritizing write operations and associated initialization for data integrity and protection of the mirrors associated with device 410.

Figure 10:
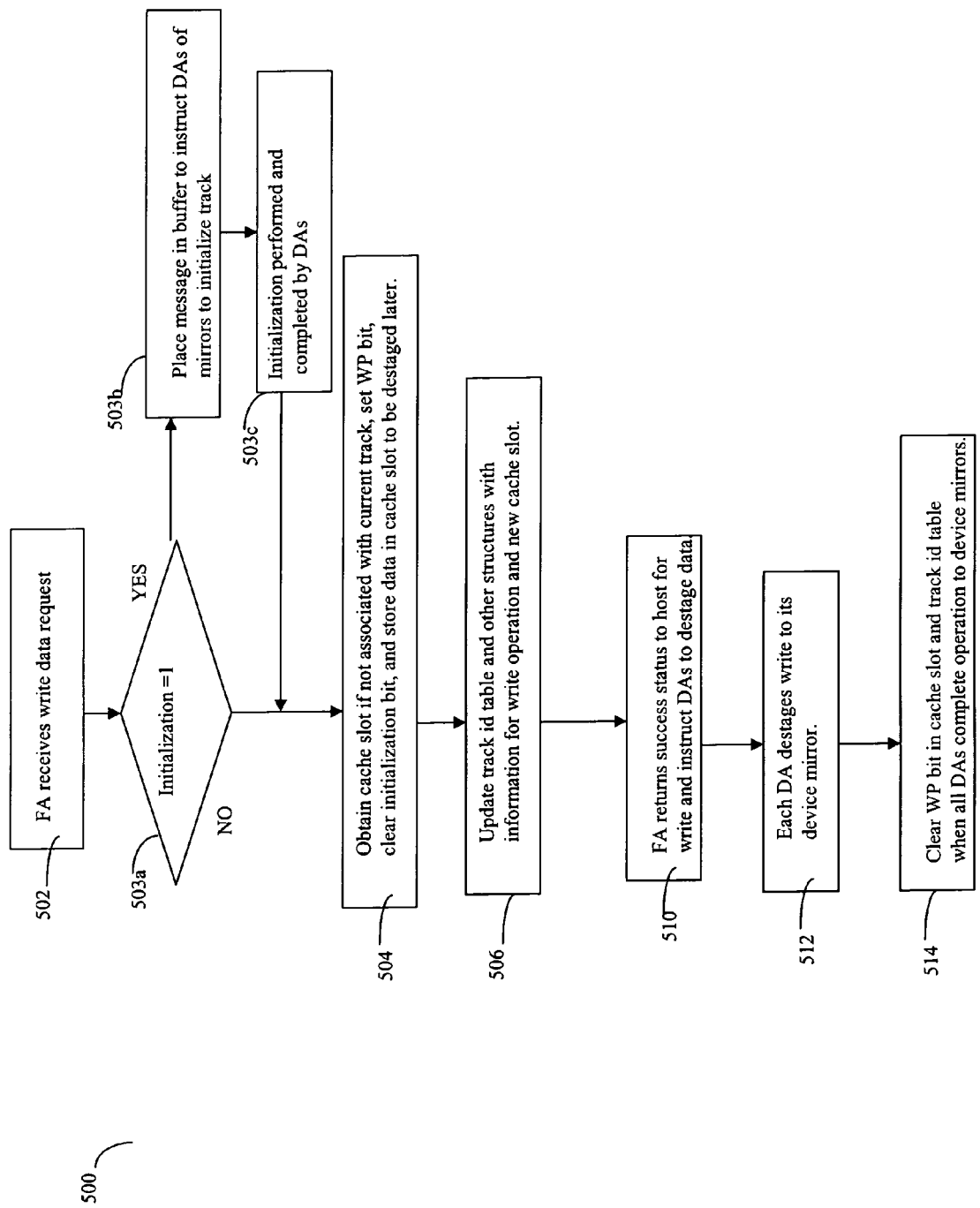
FIG. 10 is a flowchart of processing steps that may be performed in an embodiment of a data storage system in connection with a write request.

Referring now to FIG. 10, shown is a flowchart 500 of processing steps that may be performed in an embodiment of the data storage system in connection with processing a write data request as may be received by a host. The steps of flowchart 500 of FIG. 10 summarize those processing steps just described in connection with FIG. 9. In step 502, the FA receives a write data request such as from a host. At step 503a, the FA makes a determination as to whether the initialization bit=1. If step 503a evaluates to yes, control proceeds to step 503b where the FA places a message in the message buffer for each DA servicing a mirror to accordingly initialize the track of the mirror which is being serviced. At step 503c, all of the DAs servicing the mirrors complete initializing the track on the physical mirrors and the FA continues processing with step 504. At step 504, the FA performs further processing including clearing the initialization bit in the track id table entry, obtaining a cache slot if one is not already associated with the current track, setting the WP bit of the cache slot, and storing the write data in the cache slot to be destaged at a later point in time. At step 506, the FA updates the track id table and any other structures with information in accordance with the write operation and associated cache slot. Step 506 processing may include, for example, setting any appropriate bits in an entry of the track id table, updating the entry in the track id table to identify the location in cache (e.g., cache slot) including the write data, and the like. At step 510, the FA returns a success status to the host for the write operation and places another message in the message buffer for each DA servicing the mirrors to destage the data from the cache slot. In this embodiment as described herein, the host may receive such a status even though the data has not yet been destaged. At step 512, each DA subsequently destages the write data to the actual device mirror. At step 514, the WP flag in the track id table entry for the current track is cleared when all of the DAs have completed the destaging which also includes any device initialization. It should be noted that step 514 may also include the DA performing other processing of other structures to reflect the destaging operation as complete. In connection with flowchart 500 of FIG. 10, the FA performs steps 502, 504, 503a, 503b, 506 and 510. The DAs perform steps 512 and 514, and conditionally step 503c to initialize tracks of the associated mirrors.

It should be noted that an embodiment may use any one of a variety of different techniques in connection with step 503c processing in which each DA physically initializes a track of its respective mirror. In one embodiment, the initialization of the track may be processed like a write operation received which sets the track to all zeroes or another initialization value. As part of step 503c processing with reference to FIG. 9, one of the four DAs servicing the mirrors of device 410 is the first DA to obtain the message from the buffer. This first DA may obtain a cache slot and set appropriate bits to set the data of the track to all zeroes. The cache slot and associated entry in the track id table have their flags set to indicate that a write is pending for the track. Thus, the initialization of a track may be processed similar to other write operations in which a write pending cache slot indicates that the track is to have zeroes written out to each mirror. At some point later, the data (e.g., all zeroes or other initialization value) is written as part of destaging. Other embodiments may use other techniques in connection with initialization of a track.

Figure 11:
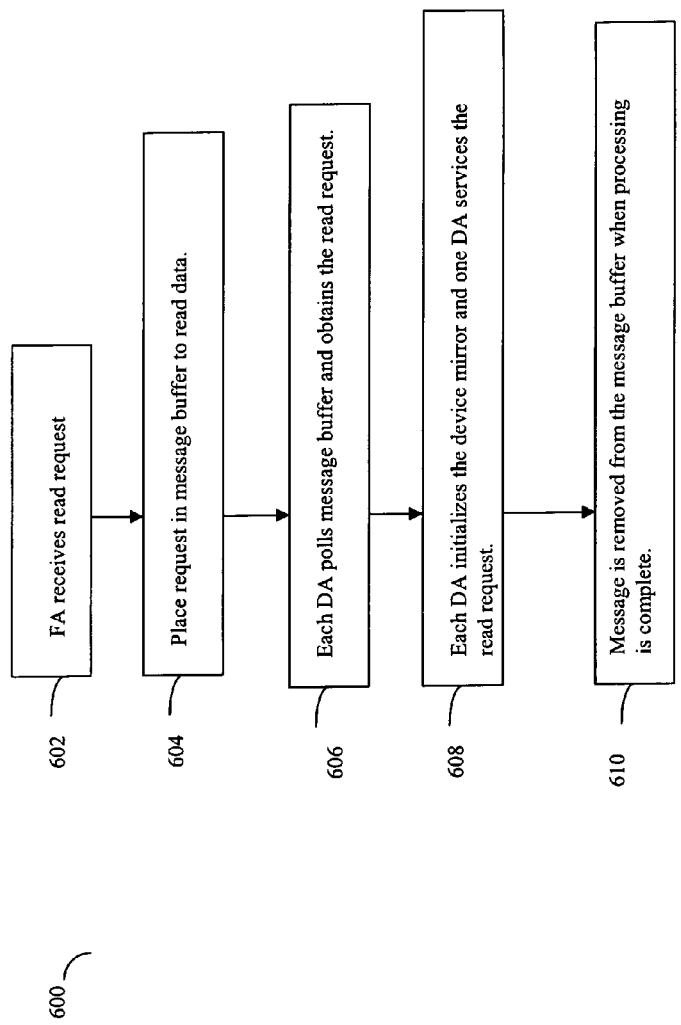
FIG. 11 is a flowchart of processing steps that may be performed in an embodiment of a data storage system in connection with a read request.

Referring now to FIG. 11, shown is a flowchart 600 of processing steps that may be performed in an embodiment in connection with a read request. The following discussion references the example and elements of FIG. 9. It should be noted that prior to performing the processing of flowchart 600 of FIG. 11, a format or initialization command may have caused processing to set the initialization bits of all of the tracks associated with device 410 indicating that the tracks have not yet been initialized. Prior to initialization of the tracks on the mirrors of device 410, a read request is received for device 410. At step 602, the FA receives the read request such as from a host. At step 604, the FA places a request in a message buffer for one of the DAs to service the read request by obtaining the data from the one of the mirrors, and placing the data into the cache. It should be noted that a message buffer may be used as a means to facilitate communication between the FA and the DA when servicing read requests. The message buffer may be stored in a portion of global memory, such as GM 420 of FIG. 9. The message buffer may include a message with its intended recipient(s) such as each of the DAs servicing the mirrors of device 410. The mirrors may be as indicated in the mirror mask of the track id table entry. Additional information regarding which devices are the mirror devices may also be stored in the track id table or other location in global memory. In this example, the FA at step 604 may place a message in the message buffer. With reference to FIG. 9, each of the DAs 1, 2, 3 and 4 are intended recipients and possible candidates that may satisfy or service a read request. An embodiment may utilize any one of a variety of different techniques in connection with designating which one or more mirrors 410b-410e may be used in connection with servicing data requests. At step 606, each DA may periodically poll the message buffer to obtain any messages designated for a DA. At step 608, each of the DAs servicing a mirror of device 410 may respond to the read request message by initializing the track associated with the read request. Additionally, one of the DAs associated with a mirror services the read request by obtaining the data and placing the data into a cache slot. Selection of the particular DA which services the read request may be performed using any of a variety of different techniques and policies that may vary with each embodiment. The initialization of the track on the mirrors may be performed by the DAs as part of servicing a read request. For the DA selected to service the read request, the initialization processing may be performed in accordance with flowchart 350 of FIG. 8 prior to servicing the data request. For the remaining DAs, the read request may trigger initialization of the appropriate track in accordance with the initialization bit settings in the track id table. At step 610, the message may be removed from the message buffer when processing of the read request, including the initialization of one or more mirror, is complete.

It should be noted that an embodiment may use any one of a variety of different techniques in connection with performing initialization processing of step 608. For example, an embodiment may process the initialization of a track like a write operation writing out zeroes or some other special initialization values to a track. This is as described elsewhere herein, for example, in connection with how an embodiment may perform initialization of a track for step 503c processing. An embodiment may use the same techniques in connection with also initializing a track of the physical device at step 608 processing.

With reference to flowchart 600 of FIG. 11, steps 602 and 604 are performed by the FA in this example, and steps 606, 608 and 610 are performed by the DA.

Using the foregoing techniques in connection with reading a track of data, each of the DAs at step 608 may be responsible for initializing the track of its associated mirror 410b-410e in accordance with the initialization bit settings of the track id table. Similarly, step 503c of FIG. 10 may include one or more DAs performing initialization of device tracks, in accordance with initialization bit settings in connection with the write operation processing.

The foregoing techniques used in connection with initialization of a device provide for a status to be returned to the host in the amount of time it takes to set the initialization bits within the track id table rather than wait for actual initialization of each of the tracks on the device. A technique is described herein which provides for prioritization of when actual initialization of particular tracks are performed, and ensuring data protection of all associated mirrors. Use of the background task for initialization also ensures that initialization of tracks of all mirrors occurs even if no data operation is ever directed to one of the tracks. In the event that a data request is directed towards one of the tracks, and initialization of the track has not yet occurred, initialization of the track is performed prior to servicing the data request.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for initializing a device in a data storage system comprising:
    receiving a command requesting processing which includes initializing said device;
    receiving a second command inquiring regarding a status of the command;
    in response to receiving the second command after said command, performing processing including monitoring the status of the command by monitoring status information indicating whether processing for the command has completed and returning a status message in accordance with the status information, said status information including one or more initialization indicators and an online indicator indicating whether the device is available;
    setting said one or more initialization indicators each associated with a portion of said device indicating that said portion is to be initialized, wherein a value of one of said initialization indicators corresponding to a portion directly indicates an initialization status for said portion;
    receiving a subsequent data request which is a write data request to write data to a first portion of said device;
    prior to performing said subsequent data request, initializing said first portion if a first initialization indicator associated with said first portion is set, wherein said initializing is performed in response to receiving said subsequent data request; and
    after completing said initializing said first portion, performing processing for said write data request including storing said write data of said write data request to a cache slot to be destaged at a later point in time and setting a write pending bit in said cache slot.

2. The method of claim 1, wherein said data storage system processes I/O operations for said device prior to completing initialization of all portions of said device.

3. The method of claim 1, wherein said command is received from a host connected to said data storage system, and the method further comprising:
    returning a status indicating completion of said command after completing processing for the command including when all initialization indicators associated with all portions of said device are set.

4. The method of claim 1, wherein each portion corresponds to a track of said device and said device is a logical device.

5. The method of claim 1, wherein said command is a format command to format said device, and the method further comprises:
    setting the device offline prior to setting said one or more initialization indicators of said device; and
    setting the device online after setting said one or more initialization indicators of said device.

6. The method of claim 1, wherein said device has no mirrors.

7. The method of claim 1, wherein said device has one or more mirrors.

8. The method of claim 1, wherein said command is received by a processor connected to a disk adapter servicing said device, said processor and said disk adapter being included in said data storage system, and the method further comprising:
    issuing a request by said processor to said disk adapter to initialize said device as part of processing for said command;
    setting by said disk adapter one or more initialization indicators associated with said device; and
    said processor returning a completion status for said command upon completion of said disk adapter setting said one or more initialization indicators and any other processing associated with said command and prior to initializing all portions of said device.

9. The method of claim 8, wherein said processor is a fibre channel adapter in communication with a host issuing said command to said data storage system.

10. The method of claim 1, further comprising:
    executing a background initialization task to initialize portions of said device in accordance with one or more initialization indicators associated with portions of said device while said device is accessible for I/O operations.

11. The method of claim 7, wherein a completion status for said command is returned prior to completing initialization of said associated device mirrors and after all initialization indicators associated with said device have been set, and each disk adapter servicing a device mirror performs initialization of said device mirror in accordance with said one or more initialization indicators associated with said device.

12. The method of claim 11, wherein said first initialization indicator is set indicating that said first portion has not yet been initialized, and wherein said storing said write data, said setting said write pending bit and clearing said first initialization indicator are performed after all disk adapters servicing all device mirrors for said device have completed said initializing said first portion on said all device mirrors.

13. The method of claim 11, wherein said each disk adapter performs initialization of said first portion of said device mirror in accordance with said first initialization indicator in connection with reading data from said first portion.

14. The method of claim 1, further comprising:
    clearing said first initialization indicator after said first portion is initialized.

15. The method of claim 1, wherein a background initialization task scans initialization indicators associated with said device and performs initialization of one or more portions of said device in accordance with the initialization indicators, said background task executing while said device is accessible for I/O operations, said background task clearing initialization indicators as associated portions are initialized.

16. The method of claim 1, further comprising:
returning a status indicating completion of said command, said status being returned prior to initializing all portions of said device and after all initialization indicators associated with said device have been set.

17. The method of claim 1, further comprising:
receiving at said data storage system the second command which is a test unit ready command from a host inquiring about the status of said command;
returning the status message indicating that said command is in progress prior to all initialization indicators associated with all portions of said device being set; and
returning the status message indicating that said command has completed when all the initialization indicators associated with all portions the device are set and when the online indicator for the device is set indicating that the device is available online and ready for use.

18. A data storage system comprising:
a disk adapter servicing a device in said data storage system;
a processor in said data storage system which receives commands to be executed by said data storage system;
wherein said data storage system includes:
code that receives a command requesting processing which includes initializing said device;
code that receives a second command inquiring regarding a status of the command;
code that, in response to receiving the second command after said command, performs processing including monitoring the status of the command by monitoring status information indicating whether processing for the command has completed and returning a status message in accordance with the status information, said status information including one or more initialization indicators and an online indicator indicating whether the device is available;
code that sets said one or more initialization indicators each associated with a portion of said device indicating that said portion is to be initialized;
code that receives a data request which is a write data request to write data to a first portion of said device;
code that, upon receiving said data request, initializes said first portion prior to processing said data request if a first initialization indicator associated with said first portion is set, wherein said code that initializes performs initialization in response to receiving said data request;
code that, after completing said initialization of said first portion, performs processing for said write data request including clearing said first initialization indicator, storing said write data request to a cache slot to be destaged at a later point in time, and setting a write pending bit in said cache slot; and
code that returns a status indicating completion of the command, prior to initializing all portions of said device and after all initialization indicators associated with said device have been set, wherein a value of one of said initialization indicators corresponding to a portion directly indicates an initialization status for said portion.

19. A computer program product for initializing a device in a data storage system comprising code for:
receiving a command requesting processing which includes initializing said device;
receiving a second command inquiring regarding a status of the command;
in response to receiving the second command after said command, performing processing including monitoring the status of the command by monitoring status information indicating whether processing for the command has completed and returning a status message in accordance with the status information, said status information including one or more initialization indicators and an online indicator indicating whether the device is available;
setting said one or more initialization indicators each associated with a portion of said device indicating that said portion is to be initialized, wherein a value of one of said initialization indicators corresponding to a portion directly indicates an initialization status for said portion;
receiving a subsequent data request which is a write data request to write data to a first portion of said device;
prior to performing said subsequent data request, initializing said first portion if a first initialization indicator associated with said first portion is set, wherein said initializing is performed in response to receiving said subsequent data request; and
after completing said initializing said first portion, performing processing for said write data request including storing said write data of said write data request to a cache slot to be destaged at a later point in time and setting a write pending bit in said cache slot.

20. The computer program product of claim 19, wherein said data storage system processes I/O operations for said device prior to completing initialization of all portions of said device.

* * * * *